United States Patent
Yamamoto

(10) Patent No.: US 8,857,062 B2
(45) Date of Patent: Oct. 14, 2014

(54) SEALED ROLLING BEARING

(75) Inventor: Ken Yamamoto, Iwata (JP)

(73) Assignee: NTN Corporation, Osaka (JP)

( * ) Notice: Subject to any disclaimer, the term of this patent is extended or adjusted under 35 U.S.C. 154(b) by 668 days.

(21) Appl. No.: 12/407,192

(22) Filed: Mar. 19, 2009

(65) Prior Publication Data

US 2009/0183370 A1    Jul. 23, 2009

Related U.S. Application Data

(62) Division of application No. 11/180,630, filed on Jul. 14, 2005, now abandoned.

(30) Foreign Application Priority Data

Jul. 20, 2004  (JP) ................................ 2004-211548

(51) Int. Cl.
  *B21D 53/10*  (2006.01)
  *F16C 33/78*  (2006.01)
  *F16C 33/80*  (2006.01)

(52) U.S. Cl.
  CPC ......... *F16C 33/7823* (2013.01); *F16C 2326/02* (2013.01); *F16C 33/805* (2013.01)
  USPC .................................... 29/898.13; 29/898.04

(58) Field of Classification Search
  USPC ........... 29/898.04, 898.13, 898.048; 384/484, 384/486; 277/402
  See application file for complete search history.

(56) References Cited

U.S. PATENT DOCUMENTS

| | | | |
|---|---|---|---|
| 5,592,840 A | 1/1997 | Miyasaka | |
| 6,481,896 B1 | 11/2002 | Ohtsuki et al. | |
| 6,497,514 B2 | 12/2002 | Maldera et al. | |
| 6,592,264 B2 | 7/2003 | Yabe et al. | |
| 6,726,544 B2 * | 4/2004 | Ozaki et al. | ...................... 451/52 |
| 6,910,948 B2 * | 6/2005 | Yoshiba et al. | ................. 451/35 |
| 7,399,733 B2 * | 7/2008 | Ogihara et al. | ............... 508/108 |

FOREIGN PATENT DOCUMENTS

| | | |
|---|---|---|
| JP | 55-063010 | 5/1980 |
| JP | 4-333521 | 11/1992 |
| JP | 7-188738 | 7/1995 |
| JP | 11-131257 | 5/1999 |
| JP | 2003-262231 | 9/2003 |
| JP | 2004-019827 | 1/2004 |

OTHER PUBLICATIONS

Notice of Reasons for Rejection issued Mar. 2, 2010 in Japanese application 2004-211548, which is a counterpart to the present application (with English translation).

* cited by examiner

*Primary Examiner* — Alexander P Taousakis
(74) *Attorney, Agent, or Firm* — Wenderoth, Lind & Ponack, LLP.

(57) ABSTRACT

A sealed rolling bearing is proposed which makes it possible to reduce the torque loss while ensuring high sealing performance. Seal lips of seal members secured to the outer ring of the bearing at both ends thereof are in sliding contact with both ends of the outer periphery of the inner ring of the bearing. These portions of the inner ring that are in sliding contact with the seal lips are subjected to minute shot peening in which minute shots of molybdenum disulfide having a particle diameter of 20 to 200 micrometers are struck against these portions at a high speed of 50 meters per second. This decreases the friction torque attendant to sliding contact of the seal lips and makes it possible to decrease the torque loss of the bearing even if the contact pressure of the seal lips is increased sufficiently to ensure high sealing performance.

3 Claims, 6 Drawing Sheets

SEALED ROLLING BEARING

This application is a divisional application of application Ser. No. 11/180,630, filed Jul. 14, 2005 now abandoned.

BACKGROUND OF THE INVENTION

The present invention relates to a sealed rolling bearing which has its bearing space sealed by seals.

Among sealed rolling bearings which have their bearing space sealed by seals to avoid leakage of a lubricating agent such as grease filled therein, there is a type which has an outer ring, an inner ring, rolling elements disposed between the inner and outer rings, and seal members secured to one of the inner and outer rings, the seal members each having seal lips kept in sliding contact with the opposing metal face of the other of the inner and outer rings or the surface of a metallic member mounted to the other of the inner and outer rings, such as a slinger.

II. Description of the Related Art

In order to ensure good sealing performance with this type of sealed rolling bearings, it is required that the seal lips, which are made of rubber or the like, be brought into sliding contact with the metal surface with a sufficiently high contact pressure. In order to ensure high sealing performance, Japanese patent publication 55-63010 proposes to form each of the seal members so as to have a plurality of seal lips including an inner lip, an outer lip and a middle lip having forked tips to increase the number of seal points where the seal lips slidably contact the metal surface.

In recent years, requirements for energy saving including fuel consumption saving are becoming more and more strong for various devices such as automotive wheel bearing assemblies using a sealed rolling bearing. In order to meet these requirements, it is necessary to minimize the torque loss of bearings while keeping sufficient sealing performance. However, increasing the contact pressure of each seal lip or increasing the number of seal lips to insure the sealing performance will result in increased friction torque of the seal lips attendant to sliding contact with the metal surface, which will in turn increase the torque loss of the bearing.

As one solution to this problem, Japanese patent publication 2003-262231 proposes to subject the metal surface with which the seal lips slidably contact to hardening or form a corrosion-resistant or rust-resistant hard film on the metal surface to improve the abrasion and corrosion resistances at the metal surface and decrease the wear of the metal surface, thereby ensuring the sealing performance while decreasing the initial interference of the seal lips, thereby decreasing the friction torque attendant to the sliding contact of the seal lips on the metal surface. With this arrangement, according to this publication, it is possible to reduce the wear of the metal surface with which the seal lips are brought into sliding contact even in a sealed rolling bearing used in environments where it is exposed to muddy water or aqueous solutions containing salt such as snow melting agents, such as a wheel bearing assembly of a motor vehicle used in cold regions.

The solution proposed by JP patent publication 2003-262231, in which the metal surface is hardened or formed with a hard film, can hardly reduce the initial interference of the seal lips. This is because even before the publication 2003-262231, it was well-known to harden bearing rings or slingers with which the seal lips are brought into sliding contact. Thus, these older bearing rings or slingers were already sufficiently hard and thus sufficiently wear-resistant. Specifically, among hardening methods recommended in the publication 2003-262231, hard chrome plating gives surface hardness of Hv 800 to 900, and non-electrolysis nickel plating gives surface hardness of Hv 500 to 800. These values are not so different from the surface hardness of older raceway rings.

Also, the friction coefficient between seal lips, which are typically made of rubber, and metal does not have any relation to the surface hardness of the metal. Therefore, the method of the publication 2003-262231 does not effectively decrease the friction torque attendant to sliding contact of the seal lips on the metal surface.

An object of the present invention is to provide a sealed rolling bearing which can decrease the torque loss while ensuring the sealing performance.

SUMMARY OF THE INVENTION

According to the present invention, there is provided a sealed rolling bearing comprising an inner ring, an outer ring, rolling elements disposed between the inner ring and the outer ring, and seal members each having a seal lip and secured to one of the inner and outer rings, the seal lips of the seal members being in sliding contact with metal surfaces which are portions of a surface of the other of the inner and outer rings, or surfaces of members mounted on the other of the inner and outer rings, the metal surfaces being subjected to minute shot peening in which minute shots having a hardness equal to greater than the hardness of the metal surfaces and having a particle diameter of 20 to 200 micrometers are struck against the metal surfaces at a speed of 50 meters per second or over.

The minute shot peening treatment is attracting attention as a means for improving the surface quality of metal products. In the minute shot peening, minute shots having a hardness equal to or over the hardness of the metal product to be treated and having a particle size of 20 to 200 micrometers are struck against the metal surface at a speed of 50 meters per second or over. By doing so, the surface of the metal product, which has a low specific heat, is heated instantly to the A3 transformation point or over if the metal product is an iron metal or to the recrystallization point or over if the metal product is a non-iron metal, and instantly cooled. This cycle repeats itself. It is known that the peening causes work hardening as well as solution, recrystallization, refining of crystallized particles, etc. Also, by striking minute shots having a hardness equal to or over the hardness of the metal against the metal surface at high speed, minute ruggedness is formed on the metal surface.

In view of such characteristics of minute shot peening, the inventor of the present invention inferred that by subjecting the metal surface on which seal lips of a sealed rolling bearing slidably contact to minute shot peening, minute ruggedness will be retained by the abovementioned surface improving effect without being abraded, and that owing to the lubricating agent retaining effect by the minute ruggedness, it is possible to reduce the friction torque attendant to sliding contact even if the seal lips are brought into sliding contact with the metal surface with a sufficient contact pressure to ensure high sealing performance. Based on this inference, the inventor measured changes in the friction torque when rubber lips were brought into sliding contact with the outer periphery of tubular test specimens that have been subjected to minute shot peening and mounted on a rotary shaft. The results of measurement confirmed that the inference is correct. Thus, the inventor adopted the above arrangement as a means for decreasing the torque loss while ensuring the sealing performance of a sealed type rolling bearing.

By using molybdenum disulfide as the material of minute shots, it is possible to cause molybdenum disulfide having solid lubricating function to attach to the metal surface, thereby reducing the friction torque attendant to sliding contact of seal lips.

Preferably, the raceway of the other of the outer ring and the inner ring, that is, the ring on which seal lips slidably contacts is finished by grinding after the minute shot peening to provide a properly finished raceway surface even if the raceway surface is hit by any stray minute shots.

The sealed rolling bearings described above can be used in a wheel bearing assembly which comprises an outer member having two raceways on its inner periphery, an inner member having raceways opposing the raceways on the outer member, and a wheel mounting flange provided on one of the outer member and the inner member.

By the arrangement according to the present invention, combined effects of ensuring high sealing performance and reducing the torque loss are achievable.

DESCRIPTION OF THE INVENTION

Figure 1:
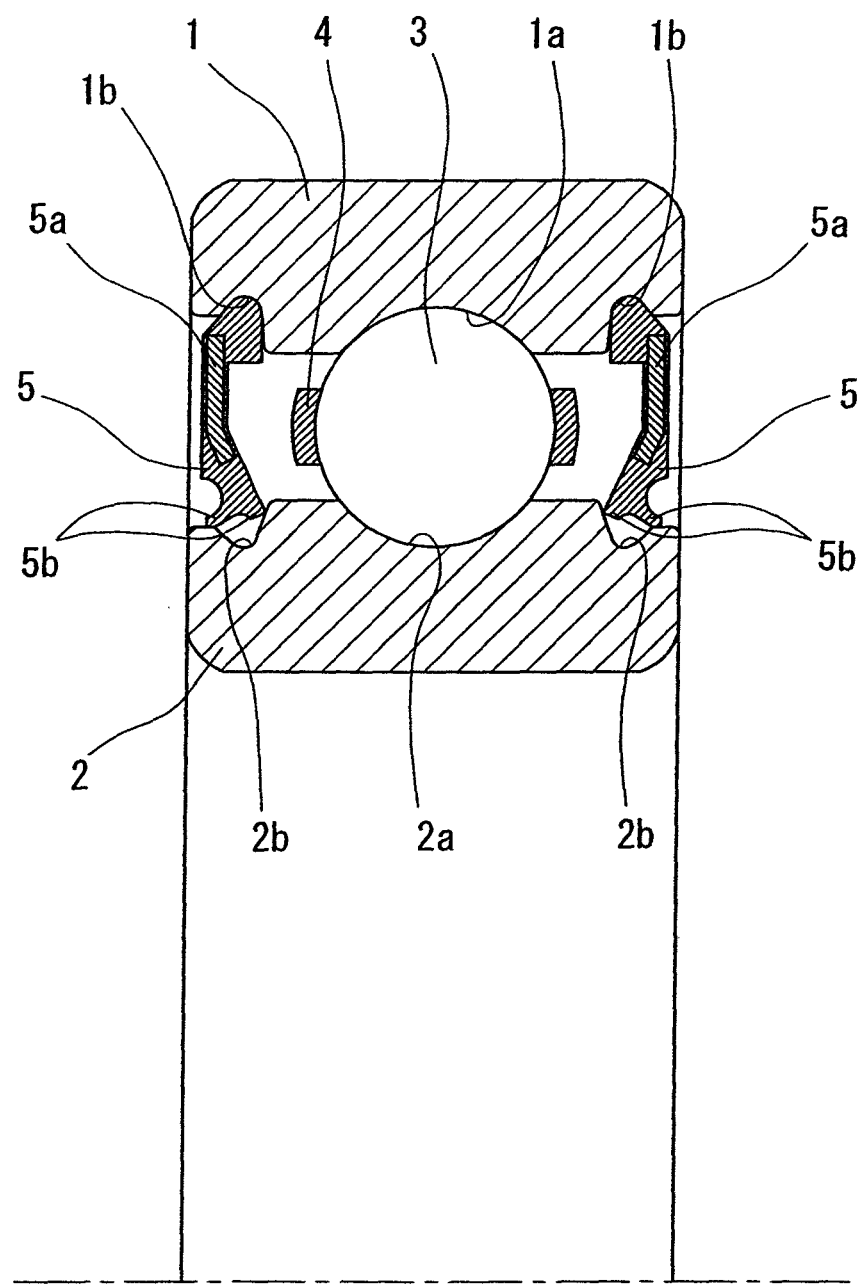
FIG. 1 is a partially cutaway vertical sectional view of a sealed rolling bearing according to a first embodiment of the present invention.

The preferred embodiments will be described with reference to the accompanying drawings. FIG. 1 shows the first embodiment. The sealed rolling bearing of FIG. 1 is a deep-groove ball bearing which includes an outer ring 1, an inner ring 2, and a plurality of balls 3 retained by a retainer 4 between a raceway 1a of the outer ring 1 and a raceway 2a of the inner ring 2. The outer ring 1 is formed with a pair of grooves 1b at both ends thereof in its inner periphery. Similarly, the inner ring 2 is formed with a pair of grooves 2b at both ends thereof in its outer periphery. In each groove 1b, a seal member 5 made of a synthetic rubber and having a metal core 5a is fitted and fixed. Each seal member 5 has at its radially inner end two seal lips 5b which are in sliding contact with the edges of the groove 2b of the inner ring 2 to seal the bearing space in which grease is filled.

The outer ring 1 and the inner ring 2 are made of bearing steel SUJ2, and their grooves 1b and 2b are finished by turning. Both ends of the outer periphery of the inner ring 2, including the grooves 2b, are subjected, after turning, to minute shot peening in which the target areas are struck with minute shots of molybdenum disulfide having a particle diameter of 20 to 200 micrometers at a speed of 50 meters per second or over. After the minute shot peening, the raceway 2a of the inner ring 2 is superfinished by grinding.

Figure 2:
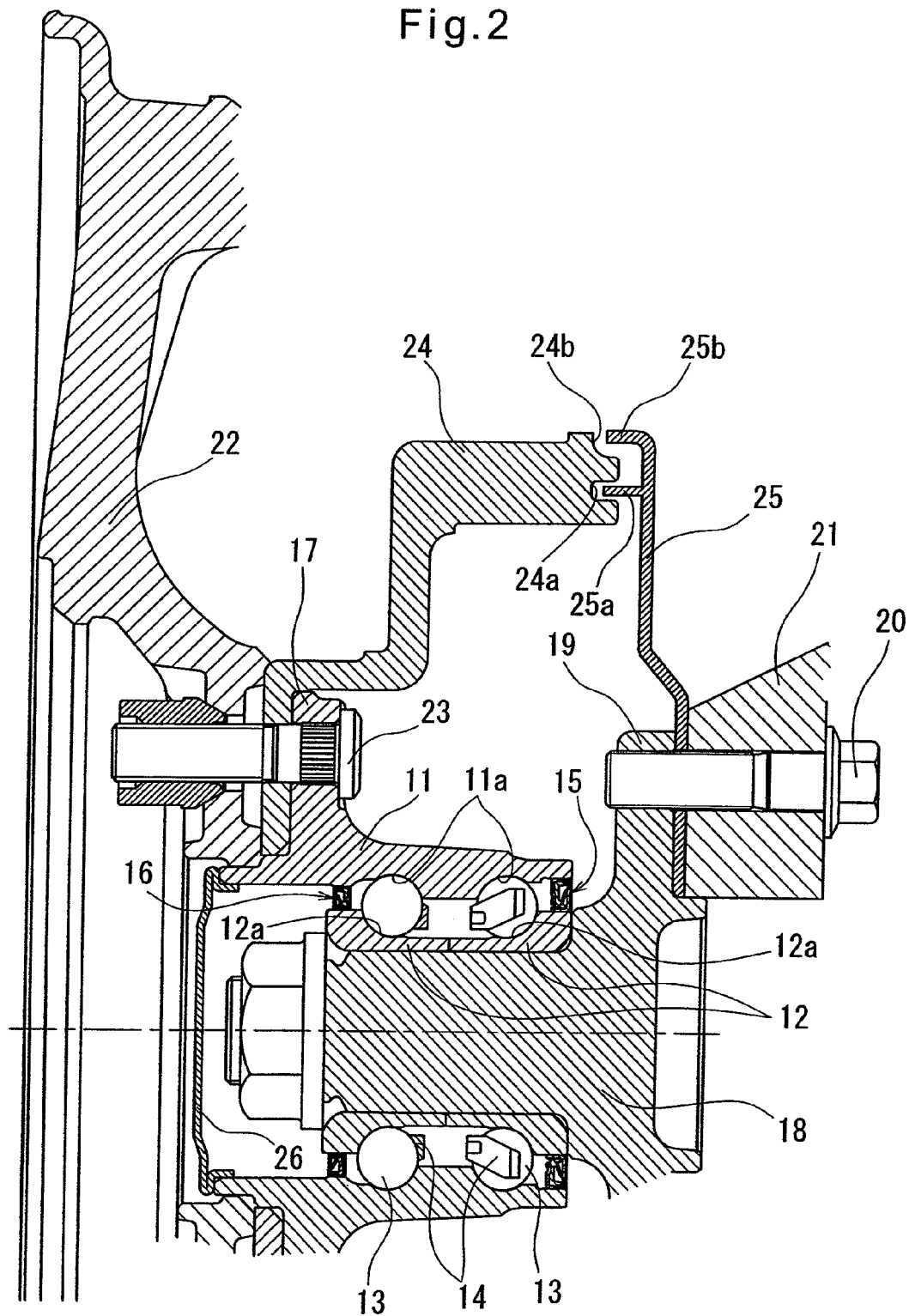
FIG. 2 is a vertical sectional view of a wheel bearing assembly including a sealed rolling bearing according to a second embodiment of the present invention.
Figure 3:
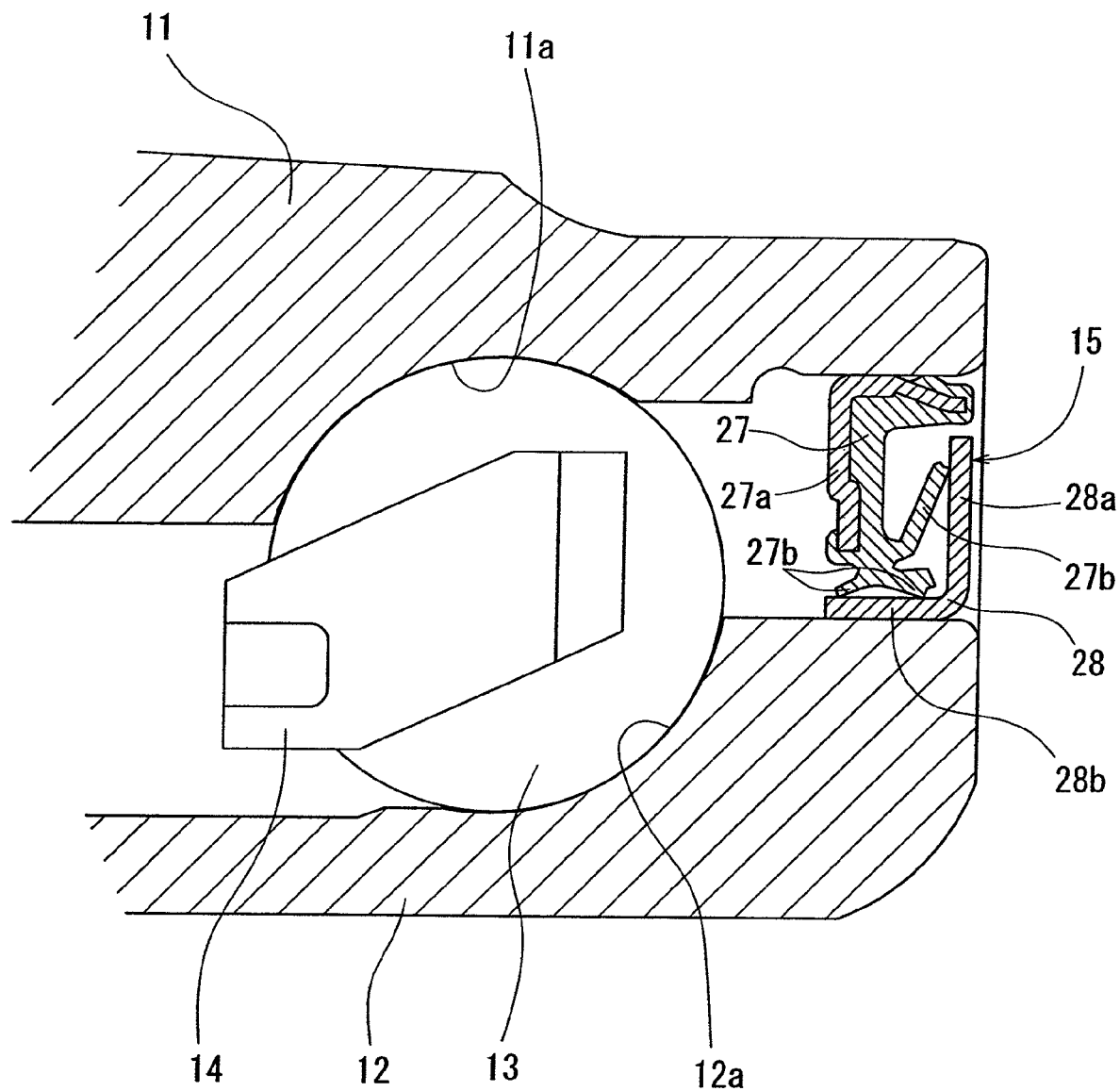
FIG. 3 is a partial enlarged view in vertical section of the wheel bearing assembly of FIG. 2.

FIGS. 2 and 3 show the second embodiment, which is a wheel bearing assembly including a sealed rolling bearing. The bearing assembly includes an outer member 11 as an outer ring having two raceways 11a in its inner periphery, an inner member comprising two inner rings 12 with their raceways 12a opposing the raceways 11a of the outer member 11, and a wheel mounting flange 17 formed on the outer member 11. Balls 13 are disposed between the raceways 11a and 12a and retained by retainers 14. The bearing space has its inboard side (i.e. the side nearer to the center of the vehicle on which the bearing assembly is mounted) and outboard side sealed by seals 15 and 16, respectively.

The wheel bearing assembly of FIG. 2 is used for a non-drive wheel. Thus, its inner rings 12 are mounted on an axle 18 having its flange 19 fastened by bolts 20 to a coupling member 21 fixed to the vehicle body, with a wheel 22 mounted on the wheel mounting flange 17 of the outer member 11 by bolts 23. To the flange 17, a brake rotor 24 for a drum brake, too, is mounted, and to the flange 19, a cover 25 for covering the outer periphery of the bearing unit is mounted.

The brake rotor 24, which rotates together with the flange 17, is formed with two recesses 24a, 24b at its tip to receive two protrusions 25a, 25b provided at the tip of the cover 25 fixed to the flange 19 to seal the outer periphery of the bearing unit so that muddy water will not enter the bearing unit from its inboard side. A cap 26 is mounted to the outboard end of the outer member 11 to prevent entry of muddy water into the bearing unit from its outboard side.

FIG. 3 shows the seal 15 for sealing the inboard side of the bearing space on an enlarged scale. The seal 15 comprises a seal member 27 fitted in the outer member 11 at its inboard end and comprising a synthetic rubber body and a metal core 27a, and an annular slinger 28 of L-section fitted on the inner ring 12 at its inboard end. The seal member 27 has three seal lips 27b, two of which slide on the cylindrical portion 28b of the annular slinger 28 and the remaining one slides on the side wall 28a of the slinger 28 to form a three-point seal. Though not shown, the seal 16 for sealing the outboard side of the bearing space is similarly structured.

The slinger 28 is formed by pressing stainless steel SUS304. The inner surface (i.e. outboard surface) of its side wall 28a and the radially outer surface of the cylindrical portion 28b, on which the seal lips 27b slide, are subjected to minute shot peening in which minute shots of molybdenum disulfide having a particle diameter of 20 to 200 micrometers are struck against these surfaces at a speed of 50 meters per second or more.

Figure 4:
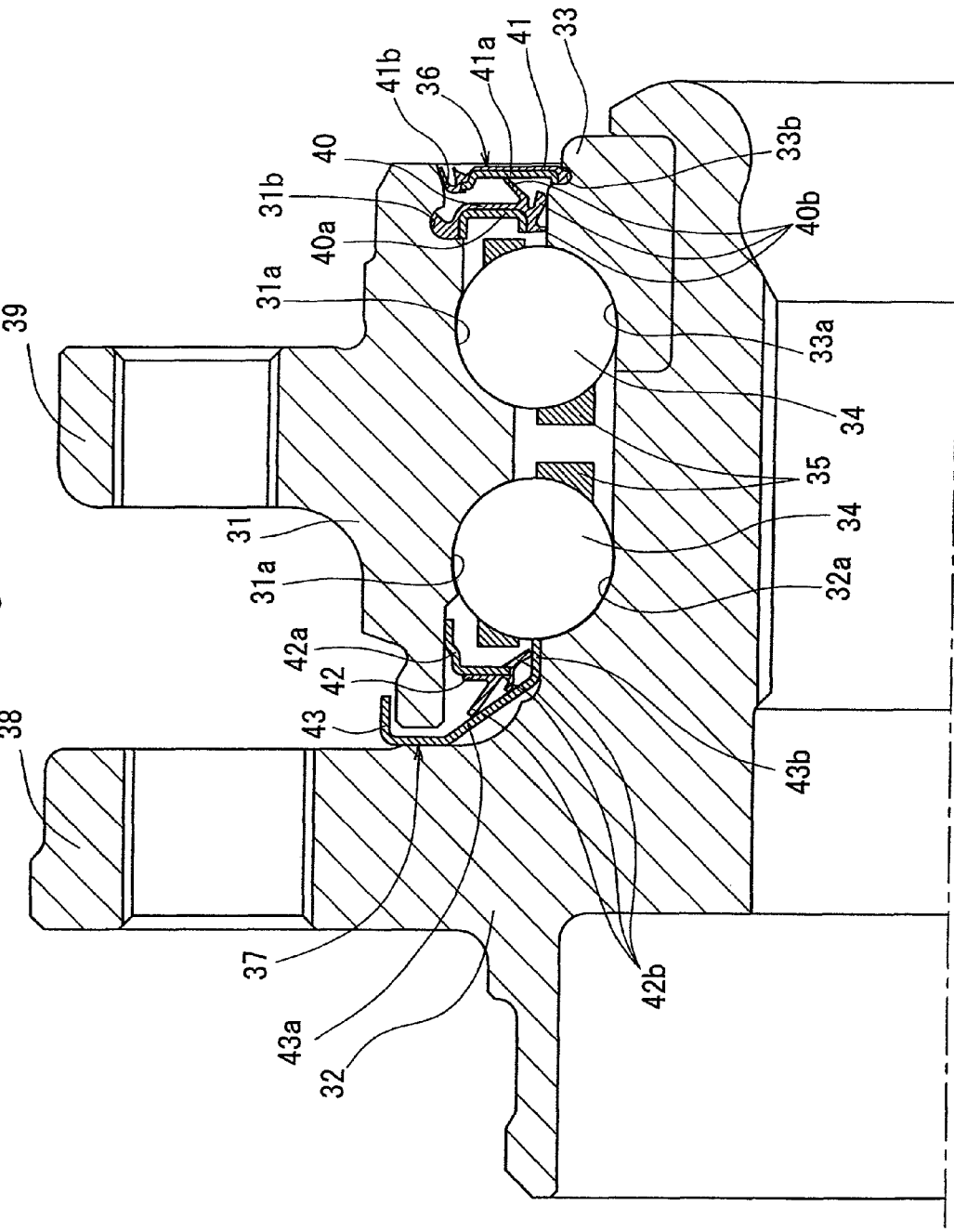
FIG. 4 is a vertical sectional view of a wheel bearing assembly including a sealed rolling bearing according to a third embodiment of the present invention.

FIG. 4 shows the third embodiment, which is, like the second embodiment, a wheel bearing assembly including a sealed rolling bearing. It comprises an outer member 31 having two raceways 31a on its inner periphery, a hub ring 32 having a raceway 32a opposing the raceway 31a on the outboard side, and an inner ring 33 mounted on the hub ring 32 and having a raceway 33a opposing the raceway 31a on the inboard side. Balls 34 are disposed in the bearing space in two rows, and retained by retainers 35. The bearing space has its inboard and outboard sides sealed by seals 36 and 37, respectively. The wheel bearing assembly of this embodiment is used to support a drive wheel. Thus, the hub ring 32 is formed with a wheel mounting flange 38 and the outer member 31 is formed with a flange 39 through which the wheel bearing assembly is mounted to the vehicle body. In this embodiment, the hub ring 32 and the inner ring 33 form the inner member.

The seal 36 on the inboard side comprises a seal member 40 fitted in a groove 31b formed in the inner periphery of the outer member 31 and having a metal core 40a, and a seal member 41 fitted in a groove 33b formed in the outer periphery of the inner ring 33 and having a metal core 41a. The seal member 40 has three seal lips 40b. Among them, the outer one is in sliding contact with the metal core 41a of the seal member 41 whereas the inner two are in sliding contact with the outer periphery of the inner ring 33. The seal member 41 has one seal lip 41b which is in sliding contact with the inner periphery of the outer member 31. The seal members 40, 41 are made of synthetic rubber. The metal cores 40a, 41a are steel plates.

The seal 37 on the outboard side comprises a seal member 42 fitted in the outer member 31 and having a metal core 42a, and an annular slinger 43 mounted on the hub ring 32. The seal member 42 has three lips 42b, two of which are in sliding contact with an inclined side wall 43a of the slinger 43 and the remaining one is in sliding contact with a cylindrical portion 43b of the slinger 43. The seal member 42, too, is made of synthetic rubber and the slinger 43 is a steel plate SUS304.

The surface of the metal core 41a, the outer peripheral surface of the inner ring 33, the inner peripheral surface of the outer member 31, and the surface of the slinger 43 with which the seal lips 40b, 41b and 42b are brought into contact are subjected to minute shot peening similar to the one used in the second embodiment. After the minute shot peening, the raceways 31a and 33a of the outer member 31 and the inner ring 33, which are made from bearing steel SUJ2, are superfinished by grinding.

Figure 5:
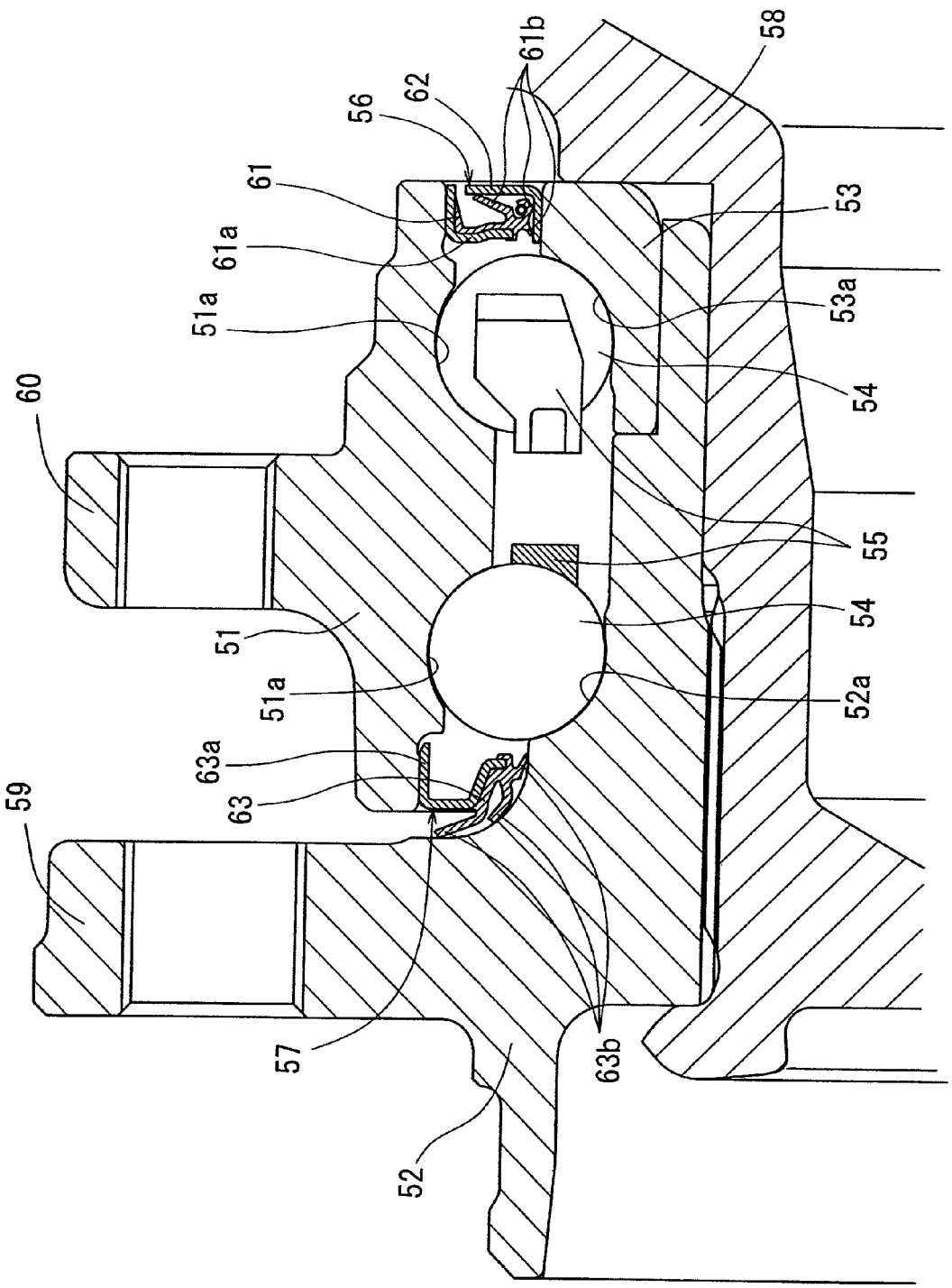
FIG. 5 is a vertical sectional view of a wheel bearing assembly including a sealed rolling bearing according to a fourth embodiment of the present invention.

FIG. 5 shows the fourth embodiment, which is also a wheel bearing assembly for a drive wheel including a sealed rolling bearing. It comprises an outer member 51 having two raceways 51a on its inner periphery, a hub ring 52 having a raceway 52a opposing the raceway 51a on the outboard side, and an inner ring 53 mounted on the hub ring 52 and having a raceway 53a opposing the raceway 51a on the inboard side. Balls 54 are disposed in the bearing space in two rows and retained by retainers 55. The bearing space has its inboard and outboard sides sealed by seals 56 and 57, respectively. In this embodiment, the hub ring 52 and the inner ring 53, which form the inner member, are mounted on an outer ring 58 of a constant-velocity universal joint. The hub ring 52 is formed with a wheel mounting flange 59 and the outer member 51 is formed with a flange 60 through which the wheel bearing assembly is coupled to the vehicle body.

The seal 56 on the inboard side comprises a seal member 61 having a metal core 61a and an annular slinger 62 of L-shape section like the seals 15 and 16 in the second embodiment. The seal member 61 has three seal lips 61b which are in sliding contact with the slinger 62 at three points. On the other hand, the seal 57 on the outboard side comprises a seal member 63 fitted in the outer member 51 and having a metal core 63a. The seal member 63 has three seal lips 63b which are in sliding contact with an arcuate corner of the hub ring 52 defined at the base of the wheel mounting flange 59. The seal members 61, 63 are made of synthetic rubber and the slinger 62 is made of stainless steel SUS304.

The hub ring 52 is made of bearing steel SUJ2. The surface of the slinger 62 and the arcuate corner of the hub ring 52 with which the seal lips 61b and 63b are in sliding contact are subjected to minute shot peening similar to the one used in the second embodiment. In this embodiment, after minute shot peening, the raceway 52a of the hub ring 52 is superfinished by grinding. The hub ring 52 is subjected to high-frequency hardening in an area including the arcuate corner, raceway 52a and the cylindrical surface on which the inner ring 53 is mounted, so that the surface is hardened to a hardness HRC of 60 to 62.

In the above embodiments, molybdenum disulfide ($MoS_2$) is used as the material of minute shots for minute shot peening. But the material is not limited thereto. For example, the minute shots may be made of tungsten disulfide ($WS_2$), boron nitride (BN) or any other material having a hardness equal to or higher than the hardness of the metal surfaces of the raceway rings and the slinger to be treated. The sealed rolling bearing according to the present invention is not limited to a ball bearing but may be any other type of rolling bearing such as a cylindrical roller bearing or a tapered roller bearing. The wheel bearing assembly according to the present invention is also not limited to any of the second to fourth embodiments.

EXAMPLE

As Examples, tubular test specimens were prepared which were formed of a stainless steel plate of SUS304 and had their outer peripheral surface subjected to minute shot peening in which minute shots of molybdenum disulfide having a particle diameter of 20 to 200 micrometers were struck against the outer peripheral surface at a speed of 50 meters per second or over. Also, as Comparative Examples, tubular test specimens were prepared which were formed of a stainless steel plate of SUS304, and not subjected to minute shot peening. The tubular test specimens of Examples and Comparative Examples were mounted on a rotary shaft of a rotation tester with lips made of synthetic rubber in sliding contact with the outer periphery of each specimen under a constant pressure, and the rotary shaft was rotated to measure changes in the friction torque between the lips and the respective specimens. The rotation speed of the rotary shaft was changed over between low speed (300 rpm) and high speed (1500 rpm). Also, the lubricating condition of the contact surface was changed over. That is, the test was conducted in two different conditions, i.e. with grease applied to the outer periphery of each specimen and with grease not applied thereto.

Figure 6:
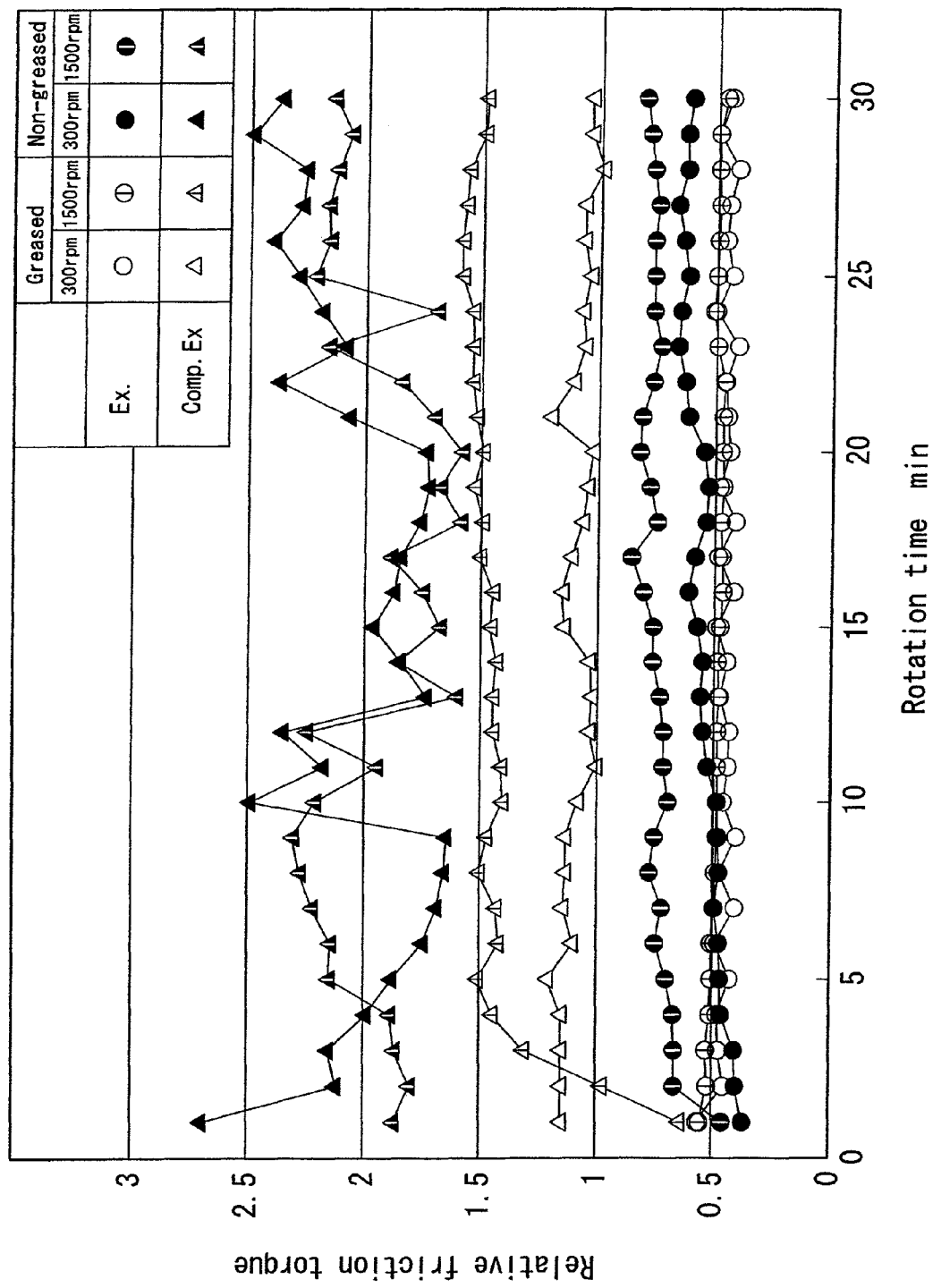
FIG. 6 is a graph showing the results of measurement of friction torque in a friction torque measuring test.

FIG. 6 is a graph showing the relationship between the relative friction torque (vertical axis) and the time during which the rotary shaft has been rotated for each specimen. The relative friction torque is a value relative to the minimum friction torque (which is 1.0) of Comparative Example which was rotated at 300 rpm with grease applied. For Comparative Examples to which no grease was applied, the relative friction torque value was about 2.0 and its variation was large. For Comparative Examples to which grease was applied, the relative friction torque increased to about 1.5 when the rotational speed was increased to 1,500 rpm. In contrast, the test specimens of Examples to which grease was applied showed very low relative friction torque (about 0.5) and small variation at either of low and high speeds, and those of Examples to which grease was not applied showed relative friction torque not higher than 0.8 and thus lower than the relative friction torque for Comparative Examples to which grease was applied.

When actually used, sealed rolling bearings ordinarily have their bearing space filled with a lubricant such as grease. Thus, the friction torques were measured for Examples and Comparative Examples of which the sliding contact surfaces were lubricated with grease as with actually used sealed rolling bearings when they were rotated at high and low speeds. Examples showed low friction torque, that is, about ½ of that of the Comparative Examples at 300 rpm (low speed) and about ⅓ at 1500 rpm (high speed). These results confirm that minute shot peening applied to the metal surface on which the seal lips slide has an effect of markedly decreasing the friction torque, thus making it possible to greatly decrease the torque loss of sealed type rolling bearings even if the contact pressure of seal lips is increased sufficiently to ensure high sealing performance.

What is claimed is:

1. A method of manufacturing a sealed rolling bearing comprising an inner ring, an outer ring, rolling elements disposed between the inner ring and the outer ring, and seal members each having a seal lip and being secured to one of the inner and outer rings, the seal lips of the seal members being in sliding contact with metal surfaces which are portions of a surface of the other of the inner and outer rings, or surfaces of members mounted on the other of the inner and outer rings, said method comprising subjecting sliding contact portions of the metal surfaces that are in sliding contact with respective seal lips to minute shot peening in which minute shots having a hardness equal to or greater than the hardness of the metal surfaces and having a particle diameter of 20 to 200 micrometers are struck against the sliding contact portions of the metal surfaces at a speed of 50 meters per second or greater; and superfinishing only a raceway of the other of the inner and outer rings by grinding after said minute shot peening of the metal surfaces, wherein the minute shots are molybdenum disulfide so as to increase surface pressure between the sliding contact portions of the metal surfaces and the seal lips.

2. A method comprising using the sealed rolling bearing of claim 1 in a wheel bearing assembly comprising an outer member having two raceways in an inner periphery thereof, an inner member having raceways opposing the respective raceways on said outer member, and a wheel mounting flange provided on one of said outer member and said inner member.

3. The method of claim 1, wherein the metal surfaces are iron and surface temperatures of the metal surfaces are instantly heated to at least an A3 transformation point as a result of said subjecting the metal surfaces to minute shot peening.

* * * * *